United States Patent [19]

Greutert et al.

[11] Patent Number: 4,740,303

[45] Date of Patent: Apr. 26, 1988

[54] METAL FILTER FOIL

[75] Inventors: Albert Greutert, Sachseln; Ruedi Gasser, Lucerne, both of Switzerland

[73] Assignee: Maxs AG, Sachseln, Switzerland

[21] Appl. No.: 938,326

[22] Filed: Dec. 3, 1986

Related U.S. Application Data

[63] Continuation of Ser. No. 779,197, Sep. 23, 1985, abandoned.

[30] Foreign Application Priority Data

Nov. 16, 1984 [DE] Fed. Rep. of Germany ....... 3441970

[51] Int. Cl.$^4$ .............................................. B01D 23/28
[52] U.S. Cl. ................................ 210/474; 210/497.01; 210/497.3; 210/498; 210/499; 55/525
[58] Field of Search ............... 210/448, 452, 469, 474, 210/477, 482, 495, 497.01, 497.1, 497.2, 497.3, 499, 498; 55/525

[56] References Cited

U.S. PATENT DOCUMENTS

| | | | |
|---|---|---|---|
| 1,576,121 | 3/1926 | Preble | 55/525 |
| 1,771,639 | 7/1930 | Jordahl | 55/525 |
| 2,645,560 | 7/1953 | Otto | 55/525 |
| 3,208,204 | 9/1965 | Persson | 55/443 |
| 3,980,563 | 9/1976 | Greutert et al. | 210/497.3 |
| 4,300,918 | 11/1981 | Cary | 55/486 |

FOREIGN PATENT DOCUMENTS 1548523 7/1979 United Kingdom .

Primary Examiner—Peter Hruskoci
Assistant Examiner—Wanda L. Millard
Attorney, Agent, or Firm—Townsend and Townsend

[57] ABSTRACT

A metal filter foil has elongated slits forming the filter openings. The slits are arranged in a plurality of groups. In each group the slits are parallel to one another, and the slits of different groups form an angle with one another.

7 Claims, 1 Drawing Sheet

METAL FILTER FOIL

This is a continuation of Ser. No. 779,197 filed Sept. 23, 1985, now abandoned.

BACKGROUND OF THE INVENTION

The invention relates to a metal filter foil having elongated filter slits, in particular for coffee filters and centrifuge baskets.

It is already known to provide flat filter foils with elongated filter slits arranged parallel to one another. It has been found that such filter foils tend to distort or ripple when embedded in plastic parts so that the appearance of such filters is poor.

BRIEF SUMMARY OF THE INVENTION

It is an object of the invention to improve a metal filter foil of the aforementioned kind such that the tendency to distortion is substantially reduced or even eliminated.

This object is achieved by the features that in at least one zone of the filter foil the filter slits are grouped in a plurality of adjacent strips and arranged in each strip parallel to one another and at an oblique angle to the longitudinal axis of the strip and that the filter slits in neighbouring strips form an angle of between 30° and 175° with one another.

Preferably, the filter slits in said zones are arranged in a herringbone pattern. Thus, a reduced tendency of distortion of the filter foil is achieved.

The most favourable arrangement is obtained when the filter slits in adjacent strips form an angle of 70° to 110° with one another.

In another development, strips having the filter slits arranged in a herringbone pattern alternate with zones in which the filter slits extend parallel or at right angles to the longitudinal axis of the strips.

It has been found that in many cases it is sufficient if the herringbone arrangement of the filter slits is only provided in the edge zone of the filter foil.

BRIEF DESCRIPTION OF THE DRAWINGS

The invention is described in further detail below on the basis of a plurality of embodiment examples with reference to diagrammatic drawings.

DETAILED DESCRIPTION OF A PREFERRED EMBODIMENT

Figure 1:
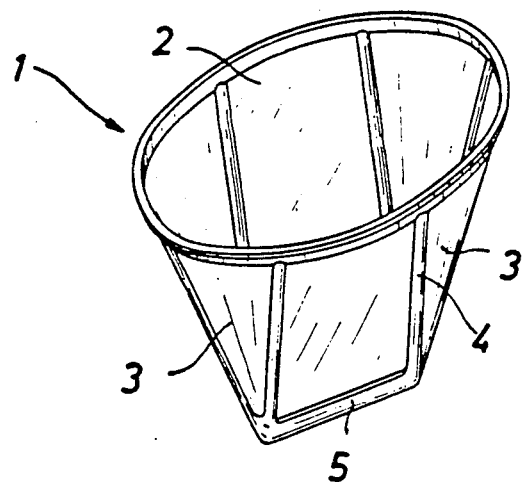
FIG. 1 is a perspective view of a basket-shaped coffee filter.

The coffee filter 1 illustrated in FIG. 1 comprises a rectangular filter foil 2 which is bent at an acute angle along its shorter centre line 5. Adjoining this filter foil 2 are filter foil sections 3 shaped to form an envelope of part of a cone.

The bent filter foil 2 and the two filter foil sections 3 are fixed together by plastic ribs 4 in which the edges of the filter foil 2 and the filter foil sections 3 are embedded to form a basket-shaped filter 1.

The filter foil 2 and eventually the filter foil sections 3 are provided with elongated filter slits which extend in a plurality of different directions.

Figure 2:
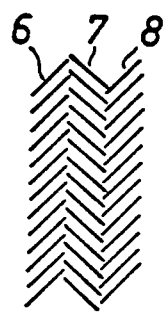
FIG. 2 shows the filter slits arranged in a herringbone pattern.
Figure 3:
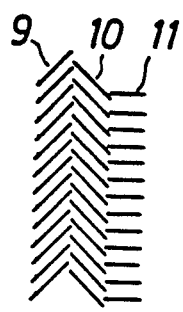
FIG. 3 shows the filter slits arranged in a modified pattern.
Figure 4:
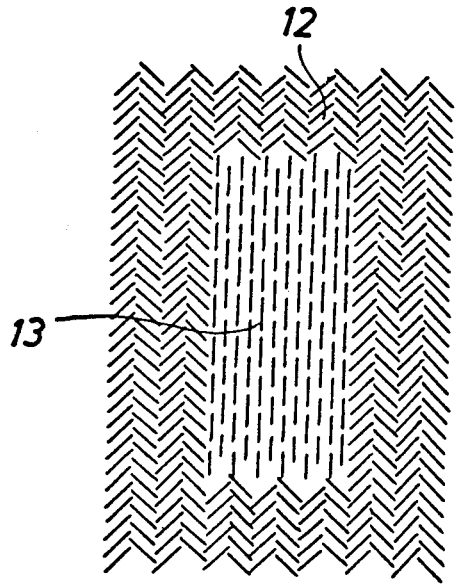
FIG. 4 shows a filter foil in which merely the edge zone is provided with filter slits arranged in a herringbone pattern.

FIGS. 2 to 4 show alternate embodiments of filter slit patterns which lead to the favourable effect of the invention. For the sake of simplicity, the filter slits are shown in a negative form, i.e. each line denotes a corresponding filter slit. The size of the filter slits may be selected with a wide range. Generally lengths of between 2 and 5 mm and widths of 0.02 to 0.15 mm of the filter slits are preferable.

FIG. 2 shows the filter slits arranged in a herringbone pattern. It may be seen that in a first group the filter slits 6 extend obliquely upwards from left to right, that in an adjacent second group the filter slits 7 extend obliquely downwards from left to right in a strip-like arrangement, and that in another adjacent group the filter slits 8 are again arranged in the same direction as the filter slits 6. Thus, the filter slits are arranged in two different directions with neighbouring pairs of strips of filter slits forming a herringbone pattern. In such a filter foil structure the bending characterisitics and the stiffness of the filter foil is such that the filter foil does not warp or form ripples when its edge is embedded in a plastic part. The angle formed by the filter slits 6 on the one hand and filter slits 7 on the other hand is 90° in the embodiment of FIG. 2.

FIG. 3 shows a modified embodiment of a filter foil in which the filter slits are arranged in three different directions, which correspond to the direction of the sides of an equilateral triangle. The filter slits 10 of the first group form an angle of 60° with the filter slits 11 of the neighbouring second group, and the filter slits 9 of a third group adjacent to the second group form an angle of 120° with the filter slits 11. Such a filter foil has a uniform stiffness which is practically independent of the direction of bending.

As illustrated in FIG. 4, only a marginal region or edge zone 12 of the filter foil has the slits arranged in accordance with the invention, whereas a central zone 13 contains elongated slits arranged in a known manner. The edge zone 12 is rectangular in shape and comprises filter slits as shown in FIG. 2. The peripheral edge of the filter foil is not shown in the drawing because of the chosen negative form of illustration.

We claim:

1. A metal filter foil for use in filtering solid particles from a fluid comprising:
    a frame including ribs;
    a smooth foil body having edges, the edges embedded in the ribs;
    alternating rows of first and second sets of parallel filter slits formed in the body, the slits of the first sets of slits oriented in a first direction, the slits of the second sets of slits oriented in a second direction, the first and second directions forming a chosen angle of between 30° to 175° to one another to create a herringbone pattern of said sets of slits; and
    the filter slits sized to prevent the solid particles from passing therethrough.

2. The filter foil of claim 1 further comprising a third set of parallel filter slits formed in a body, the slits of the third set of slits oriented in a third direction.

3. The filter foil of claim 2 wherein the first sets of slits has a first longitudinal orientation.

4. The filter foil of claim 3 wherein the third direction is parallel to the first longitudinal orientation.

5. The filter foil of claim 3 wherein the third direction is perpendicular to the first longitudinal orientation.

6. The filter foil of claim 1 wherein the chosen angle is between 70° and 110°.

7. A metal filter foil for use in a coffee filter to filter coffee grounds from liquid comprising:
- a frame including ribs;
- a smooth metal foil having edges, and edge zone adjacent the edges and a central zone, edges embedded in the ribs;
- alternating rows of first and second sets of parallel filter slits formed in the body, the slits of the first sets of slits oriented in a first direction, the slits of the second sets of slits oriented in a second direction, the first and second directions forming a chosen angle of between 30° and 175° to one another, the first and second sets of filter slits arranged in a herringbone pattern at the edge zone;
- a third set of parallel filter slits formed in the central zone of the body, the slits of the third set of slits oriented in a third direction; and
- the filter slits sized to prevent coffee grounds from passing therethrough.

* * * * *